(12) United States Patent
Guldi et al.

(10) Patent No.: US 6,267,894 B1
(45) Date of Patent: *Jul. 31, 2001

(54) METHOD FOR EFFICIENT FILTRATION OF CHEMICAL BATHS

(75) Inventors: Richard L. Guldi, Dallas; Vikram N. Doshi, Plano; James M. Drumm, Garland, all of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,028

(22) Filed: Dec. 3, 1998

Related U.S. Application Data

(60) Provisional application No. 60/067,277, filed on Dec. 3, 1997.

(51) Int. Cl.$^7$ .............................. B01D 29/52; B01D 37/04
(52) U.S. Cl. .................... 210/739; 210/745; 210/805; 210/96.1; 210/138; 210/143; 210/196; 210/340; 210/341; 134/902
(58) Field of Search .................................. 210/252, 253, 210/195.1, 258, 259, 260, 767, 805, 194, 96.1, 739, 138, 143, 167, 340, 341, 745, 196, 900; 134/902; 73/61.71

(56) References Cited

U.S. PATENT DOCUMENTS

| | | | |
|---|---|---|---|
| 2,979,160 | * | 4/1961 | Haas . |
| 4,568,438 | * | 2/1986 | Lauke . |
| 4,659,450 | * | 4/1987 | Lauke . |
| 5,262,047 | * | 11/1993 | Benskin et al. . |
| 5,647,386 | * | 7/1997 | Kaiser . |

* cited by examiner

Primary Examiner—W. L. Walker
Assistant Examiner—David Sorkin
(74) Attorney, Agent, or Firm—Mark A. Valetti; Wade James Brady, III; Frederick J. Telecky, Jr.

(57) ABSTRACT

A method of filtering a bath (1,31) having a liquid containing particles of varying sizes therein and the recirculation and filtering system. The method and system require providing a recirculation route from the bath outflow and returning to the bath inflow. The route includes a first path communicating with the bath outflow and having serially a first controllable valve (5,9) and a filter having a relatively large pore size. The route also includes a second path communicating with the bath outflow and having serially a second controllable valve (11,15) and a filter having a relatively small pore size. There is a return path from each filter to the bath inflow. The return path from each filter can be a separate path or the paths can be connected at the output end before returning to the bath. The particle count in the recirculation route can be monitored either between the bath outflow and the first and second valves (3), between the bath inflow and each of the filters having large and small pore size (23), or both for controlling operation of the first and second valves. The controllable valves can also be controlled by a time program, bath operation program or the like.

18 Claims, 1 Drawing Sheet

METHOD FOR EFFICIENT FILTRATION OF CHEMICAL BATHS

This application claims priority under 35 USC § 119(e)(1) of provisional application number 60/067,227 filed Dec. 3, 1997.

BACKGROUND OF THE INVENTION

1. Field of the Invention

This invention relates to a method of rapid filtration of a chemical bath having particles therein of greatly varying sizes.

2. Brief Description of the Prior Art

Chemical baths, particularly such baths used in the fabrication of semiconductor devices, become contaminated with particles that may enter the bath from the semiconductor wafer introduced into the bath, from the chemical processing of the wafer, from the ambient and from countless other sources. Such contaminants can vary in size from very small to very large. It is necessary to remove these contaminants from the bath with increased requirement for removal of the very small particles as the geometry of the semiconductor devices is diminished.

Contaminant removal involves recirculation of the bath fluids through filters prior to reintroduction of the bath fluids back into the bath. The normal convention for recirculating and filtering a solution is to input the filtered solution into the tank bottom at the center of the tank and allow the solution being used in the tank to overflow over the tank top and into a wier with the overflow then being extracted from the bottom of the wier. In order to insure removal of the smaller particles, a small pore filter has been used which was capable of removing the smaller particles of interest. A problem with the use of such small pore filters is that the flow of fluid in the recirculation path is limited, thereby preventing rapid removal of all particles and particularly the larger particles. When larger pore sized filters have been used in place of the small pore filters, in situ particle monitors (ISPMs) have revealed a lower total particle count than when the smaller pore sized filter is used. This effect results from the fact that the bath fluid makes more passes through the filter and, presumably, the large particles trapped in the filter provide some filtering action also. However, this method still fails to remove a sufficient amount of the small particles for many types of devices and this problem will be exacerbated with the further diminution of device geometries. It is therefore apparent that a solution to the problem of particle removal is required wherein small particles can be removed in adequate amounts while filtration proceeds at a rapid rate.

BRIEF DESCRIPTION OF THE INVENTION

The above problem of filtration is minimized in accordance with the present invention.

Briefly, there is provided a dual path into the recirculation line, one path with large pore filtration having pores from about 0.2 to about 2.0 micrometers and the other path with small pore filtration having pores from about 0.001 to about 0.2 micrometers. It should be understood that the pore sizes of the filters will depend upon the requirements of the operation being conducted, it merely being necessary that the large pore filter be sufficiently large to trap a reasonable amount of the large particulate material and pass through the small particulate material with the small pores being generally from about 20 to about 80 percent of the size of the large pores. Programmability between the two paths is provided such that either or both paths can be used at any time. The programmability can be based upon any predetermined criterion, such as, for example, whether or not the bath is in use, the particle count in the recirculation line as determined by, for example, an ISPM, etc.

A first preferred embodiment of the filtration system in accordance with the present invention includes a single pump embodiment wherein effluent from a chemical bath is passed along two parallel paths, one path containing a filter with large pores and the other path containing a filter with small pores. The output of both filters is pumped back to the bath by a single pump. One or more controllable valves are provided in each path to control the flow to each of the filters whereby either filter, both filters or no filter can be in use at any time. The valves are under control of an external source such as, for example, an ISPM which can be in the recirculation path upstream or downstream of the filters or both.

A second preferred embodiment of the filtration system in accordance with the present invention includes a dual pump embodiment wherein effluent from a chemical bath is passed along two paths, one path containing a filter with large pores and the other path containing a filter with small pores. The output of each filter is separately pumped back to the bath. One or more controllable valves are provided in each path to control the flow to each of the filters whereby either filter, both filters or no filter can be in use at any time. The valves are under control of an external source such as, for example, one or more ISPMs which can be in the recirculation path upstream or downstream of the filters or in both locations.

The present invention provides flexibility in filtration to meet specific process requirements. Filtration is programmable to permit different filtration for product as against an empty bath, as a function of process time or dependence upon bath conditions as determined by ISPM. Also, often filtration is required before commencement of a fabrication process even when all or part of the bath has not previously been used since the addition of new materials into the bath can also introduce unwanted particles.

It should be understood that the filters used in accordance with the present invention can be any type of filter or filter-like material such as, for example, those that remove ionic, metallic, organic, bacterial, biologic or other specific contaminants in the stream.

DESCRIPTION OF THE PREFERRED EMBODIMENT

Figure 1:
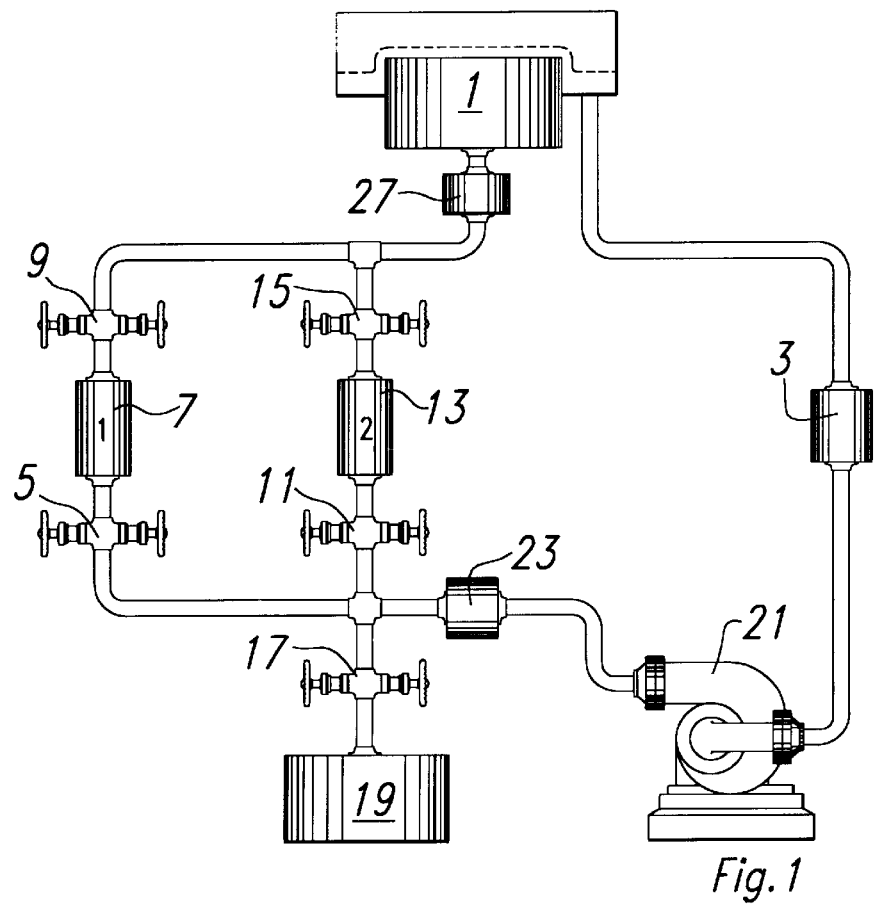
FIG. 1 is a schematic diagram of a filtering system using a single pump in accordance with a first embodiment of the present invention.

Referring first to FIG. 1, there is shown a bath 1 containing a liquid and having particles of varying size therein to be removed. The liquid is recirculated through the filtering system and back to the bath by initially travelling through an optional ISPM 3 which monitors the particles in the flow path in standard manner. The liquid then travels through a pair of parallel paths, one of the paths containing a controllable valve 5, a small pore filter 7 and a controllable valve 9 and the other path containing a controllable valve 11, a large pore filter 13 and a controllable valve 15. The output of the filters 7 and 13 is then recirculated to the bath 1 through an optional ISPM 27, the ISPM 27 also being capable of controlling the valves 5, 9, 11, 15 and 17. The output is pumped by a pump 21 to the parallel paths and, if excessively dirty as measured by ISPM 3, can be dumped into a dump 19 through valve 17 before reaching the parallel paths. The output can also be recirculated to the parallel paths, whether on not excessively dirty, to the bath 1 by the pump 21 with an optional ISPM 23 in the recirculation path before the filters or/after the pump or an optional ISPM 27 after the filters and before the solution returns to the bath 1. The valves are controlled either by the ISPM 3 and/or 23 and/or 27 or by some other external source. One method of controlling the valves is to place the ISPM(s) 3 and/or 23 and/or 27 in the path, obtain a history of operation, optimize the valve programmation for best particle removal and then remove the ISPM(s) and program the valve sequencing.

Figure 2:
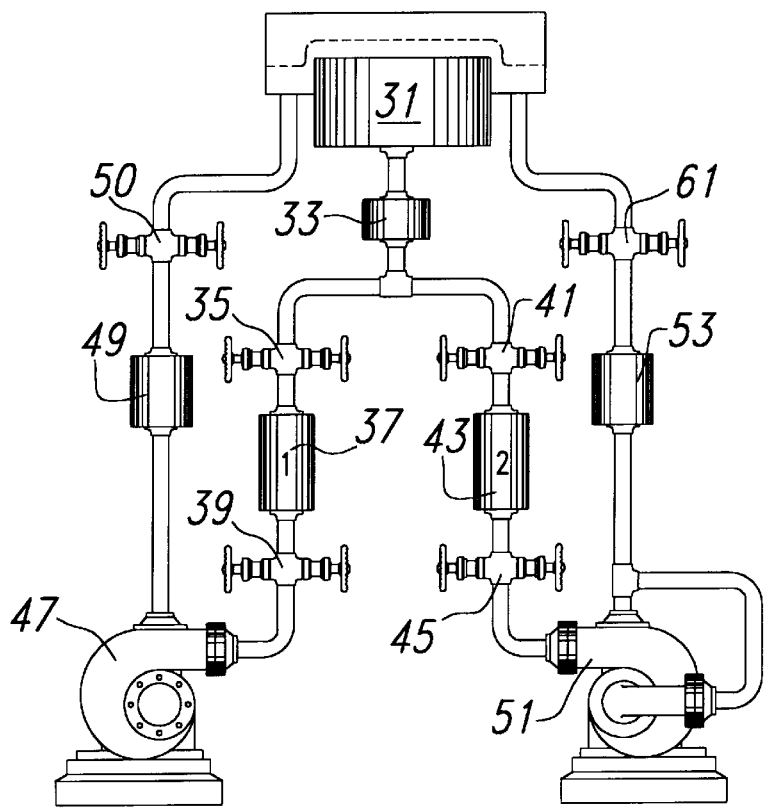
FIG. 2 is a schematic diagram of a filtering system using a dual pump in accordance with a second embodiment of the present invention.

Referring to FIG. 2, there is shown a bath 31 containing a liquid and having particles of varying size therein to be removed. The liquid is recirculated through the filtering system and back to the bath by initially travelling along two paths, one or both of which may be blocked by a valve 50 or 61, one in each path. One path includes, in addition to valves 50 and 61, optional ISPMs 49 and 53 which monitor the particles in each flow path in standard manner. The liquid then travels to pumps 47 and 51, one in each path, each pump moving the liquid along its path to the tank 31. The path from pump 47 contains a controllable valve 39, a small pore filter 37 and a controllable valve 35 and the path from pump 51 contains a controllable valve 45, a large pore filter 43 and a controllable valve 41. The filtered output from valves 35 and 41 is passed through an optional ISPM 33 and then travels to the bath 31 where it is input at the bottom center of the bath. The valves are controlled either by the ISPM 33 and/or ISPMs 49 and 53 or by some other external source. One method of controlling the valves is to place the ISPM(s) in the path, obtain a history of operation, optimize the valve programmation for best particle removal and then remove the ISPM(s) and program the valve sequencing operation.

A further method of operation (not shown) provides, upon initiation for use in conjunction with large and small pore filtration, an initial determination whether or not the bath such as 1 or 31 is in use. If the bath is not in use, only the small pore filtration system is used. If the bath is in use, only the large pore filtration system is used.

A still further method of operation is provided wherein the user controls programmability to select either or both filtration paths. As an example, from time 0 to 5 minutes only the large pore filter is used and thereafter only the small pore filter is used.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A method of filtering a liquid disposed in a bath for use in conjunction with the fabrication of semiconductor devices, said liquid containing particles of varying sizes therein which includes the steps of:
    providing a bath and a pair of independent recirculation routes from said bath and returning to said bath including a bath outflow from said bath to said pair of recirculating routes and a bath inflow from said pair of recirculating routes to said bath:
        (i) the first of said pair of recirculating routes directly communicating with said bath outflow and said bath inflow and having serially a first controllable valve and a first filter having a relatively large pore size having pores of from about 0.2 to about 2.0 micrometers; and
        (ii) the second of said pair of recirculating routes directly communicating with said bath outflow and said bath inflow and having serially a second controllable valve and a second filter having a relatively small pore size of from about 0.001 to about 0.2 micrometers;
        (iii) said first and second routes each providing a return path from each of said first and second filters to said bath inflow passing said liquid from said bath along the associated recirculation route and back to said bath;
    monitoring the particle count in each of said recirculation routes; and
    controlling said first and second controllable valves individually in response to said particle count.

2. The method of claim 1 further including the steps of storing a preferred sequence of operation of said first and second valves and then controlling said first and second valves in accordance with said stored preferred sequence of operation.

3. The method of claim 1 wherein, initially said filter having relatively large pore size is initially exclusively in operation.

4. The method of claim 1 wherein said filter having relatively large pore size is turned off after a predetermined time period and said filter having small pore size is turned on.

5. The method of claim 1 wherein, initially said filter having relatively small pore size is initially exclusively in operation.

6. The method of claim 1 further including the step of sensing when said bath is not operational and, in response thereto, controlling operation of said first and second valves.

7. A system for filtering a liquid disposed in a bath for use in conjunction with the fabrication of semiconductor devices, said liquid containing particles of varying sizes therein which includes:
    a bath and a pair of recirculation routes from said bath and returning to said bath including a bath outflow and a bath inflow, said recirculating routes including:
        (i) a first path communicating with said bath outflow and having serially a first controllable valve and a first filter having a relatively large pore size of from about 0.2 to about 2.0 micrometers;
        (ii) a second path independent of said first path, communicating with said bath outflow and having serially a second controllable valve and a second filter having a relatively small pore size of from about 0.001 to about 0.2 micrometers; and
        (iii) a return path from each of said first and second filters to said bath inflow;
    a particle monitor for monitoring the particle count in each of said recirculation routes and controlling said first and second controllable valves individually in response to said particle count.

8. The system of claim 7 further including a storage device for storing a preferred sequence of operation of said first and second valves and then controlling said first and second valves in accordance with the stored preferred sequence of operation.

9. The system of claim 8 wherein, initially said filter having relatively large pore size is initially exclusively in operation.

10. The system of claim 8 wherein said filter having relatively large pore size is turned off after a predetermined time period and said filter having small pore size is turned on.

11. The system of claim 8 wherein, initially said filter having relatively small pore size is initially exclusively in operation.

12. The system of claim 8 further including means for sensing when said bath is not operational and, in response thereto, controlling operation of said first and second valves.

13. A method of filtering liquid disposed in a bath for use in conjunction with the fabrication of semiconductor devices, said liquid containing particles of varying sizes therein which includes the steps of:

(a) providing a bath and a pair of independent recirculation routes from said bath and returning to said bath including a bath outflow from said bath to said pair of recirculating routes and a bath inflow from said recirculating routes to said bath:

(i) the first of said pair of recirculating routes directly communicating with said bath outflow and said bath inflow and having serially a first controllable valve and a first filter having a relatively large pore size of from about 0.2 to about 2.0 micrometers; and (ii) the second of said pair of recirculating routes directly communicating with said bath outflow and said bath inflow and having serially a second controllable valve and a second filter having a relatively small pore size of from about 0.001 to about 0.2 micrometers;

(iii) said first and second paths each providing a return path from each of said first and second filters to said recirculating route and said bath inflow; and (iv) at least one particle counter in a said recirculating route for measuring particle count in at least one of said bath inflow and bath outflow; and (b) controlling said first and second controllable valves in response to the measured particle count of said at least one particle counter.

14. The method of claim 13 further including the steps of storing a preferred sequence of operation of said first and second valves and then controlling said first and second valves in accordance with said stored preferred sequence of operation.

15. The method of claim 13 further including the step of controlling said filters such that said filter having relatively large pore size is initially exclusively in operation.

16. The method of claim 15 further including the step of turning off said filter having relatively large pore size after a predetermined time period and turning on said filter having small pore size.

17. The method of claim 13 further including the step of controlling said filters such that said filter having relatively small pore size is initially exclusively in operation.

18. The method of claim 13 further including the step of sensing when said bath is not operational and, in response thereto, controlling operation of said first and second valves.

* * * * *